United States Patent [19]
He

[11] Patent Number: 5,437,884
[45] Date of Patent: Aug. 1, 1995

[54] METHOD OF PROCESSING DUCK FEET

[76] Inventor: Jueling He, 60 Baruch Dr., Apt. 12D, New York, N.Y. 10002

[21] Appl. No.: 284,882

[22] Filed: Jul. 22, 1994

[51] Int. Cl.$^6$ .............................................. A23L 1/312
[52] U.S. Cl. ................................... 426/253; 426/480; 426/509; 426/641; 426/645; 452/135
[58] Field of Search ............... 426/253, 257, 509, 641, 426/645, 254, 256, 258, 480; 452/135, 136, 137

[56] References Cited

U.S. PATENT DOCUMENTS

| | | | |
|---|---|---|---|
| 155,510 | 9/1874 | Fales | 426/641 |
| 3,577,241 | 5/1971 | Means et al. | 426/254 |
| 4,198,440 | 4/1980 | Le Jeune | 426/480 X |

Primary Examiner—Arthur L. Corbin
Attorney, Agent, or Firm—Lilling & Lilling

[57] ABSTRACT

This process is used to remove the bones and joints from duck feet and to process the duck feet to make them edible. Initially, the duck feet are frozen for one or two days and are then thawed. After slow cooking for fifteen minutes, the duck feet are soaked in cold water for twenty minutes. After refrigerating for two hours, the bones and joints of the feet are removed. For about five minutes, cold water is run over the duck feet and then the duck feet are washed for 90 to 120 minutes in a solution of oxygen bleach and 100 degree F. water. Then, cold water is run over the cold feet for two hours and then the duck feet are refrigerated for two hours. At that point, the duck feet are ready for packaging or for serving or for additional cooking.

5 Claims, No Drawings

METHOD OF PROCESSING DUCK FEET

FIELD OF THE INVENTION

This invention relates to the food processing industry and, in particular it relates to the processing of duck feet for edible consumption.

BACKGROUND OF THE INVENTION

Especially among oriental people, duck feet are considered a delicacy and there are many ways of preparing them for consumption. In all cases, one of the problems is the removal of bones from the feet. One of the problems in the prior art is the removal of these bones without substantially tearing or ripping the skin and the meat.

SUMMARY OF THE INVENTION

This method is for processing duck feet. The process includes the steps of freezing, thawing, slow cooking, cooling, bone removal, washing, and refrigeration. In the step of removal of the toe bones, a hollow tube is used to remove only the bones and the skin immediately above. The meat below the toe bones remains intact.

DETAILED DESCRIPTION OF THE INVENTION

As this method involves the processing of meat products for edible consumption, the process must necessarily be conducted in safe and sterile conditions. Workers should wear appropriate uniforms, caps and gowns in order to maintain cleanliness. Further, workers should thoroughly clean their hands prior to working on the food and gloves should be worn except for those who are involved in the last steps of the bone-removal process.

Fresh duck feet would first be frozen for one or two days at a temperature of about −20 degrees F. Then, the duck feet are thawed. This will typically be done by placing the frozen duck feet in a stainless steel sink and running warm water over them. After thawing of the duck feet, the feet are placed in boiling water in a stainless steel pot and then slowly cooked for twelve-and-a-half to fifteen minutes. This is done by placing the duck feet in a stainless steel pot with water covering the feet by about an inch. The pot is placed on a range and the water is heated at a high setting until it boils. Then the temperature is lowered and the duck feet are cooked very slowly for about 12½ to 15 minutes.

The duck feet are then cooled, quickly, so as to stop the cooking process. This is typically done by pouring the hot water along with the feet from the pot and then leaving the feet in the sink and permitting cold water to run over the duck feet for about twenty minutes.

The duck feet are then chilled for two hours at about 40 degrees F. Typically this can be done by placing the duck feet in aluminum colander or other suitable container, in a refrigerator. Then the duck feet are removed from the refrigerator and placed on a stainless steel table.

First, the minor toe and the nails and tips of the three major toes are removed. This may be done with a knife or a hollow tube by simply severing the minor toe and the ends of the major toes. Next, the bones of the remaining toes are removed. This is accomplished by inserting a hollow tube around the bones of the toe so that the bottom of the tube is as close as possible to the bottom of the bone. The top of the tube will be above the skin which covers the top of the toe (i.e. some space remians between the inner surface of the tube and the outer surface of the toe).

As the tube is moved down the length of the toe, the tube detaches the meat which is below the bone from the bone itself. The skin on top of the bone is severed from the skin on either side and remains attached to the bone. When the tube is moved down the complete length of the toe (and surrounds both bones of the toe) it is manipulated upwards to sever the toe bone from its joint. Then, the toe bones are removed by hand, leaving the meat below the bone intact. This is repeated for the remaining toes.

The next step is to remove the supporting bone in the upper portion of the foot. This is accomplished by using a knife to make two incisions along either side of the bone. The knife is then used to cut a circle around the exposed, disc-shaped tendon at the end of the foot, detaching it from the surrounding meat. The supporting bone and the tendon are then removed by hand.

This process is ideally done on a clean, stainless steel work table of the type typically found in food processing facilities. The hollow tube is about 1½ centimeters in diameter or ¾ of an inch in diameter. Preferably, its length is 4½ inches and the thickness of the wall is about 0.01 centimeter. The opening of the tube is cut at an angle so as to create an oval. Any stainless steel cooking knife may be used. In the preferred application of the invention, the knife is 6 inches long with a blade that is ⅝ of an inch in width and is 0.01 centimeters thick at the top.

After the removal of the bones, the feet are placed under cold running water in the sink for about five minutes.

The duck feet are then warmed in 100 degree F. water. This is typically done by placing the stopper in the sink and filling the sink with hot water to just cover the duck feet by about an inch. An oxygen bleach is then introduced into the water in order to treat the duck feet in order to avoid spoilage and to purify the feet. In the preferred embodiment, the oxygen bleach is Acto-140, which is distributed by Birko Corporation of Denver, Colo. Generally, about 6–10 ounces of oxygen bleach would be used for every 30 lbs. of drained duck feet. The duck feet would remain in the hot water solution with the oxygen bleach for about 90 to 120 minutes with stirring every 20 minutes.

Thereafter, the water with the oxygen bleach solution is drained and the duck feet are washed under cold water for about two hours.

The duck feet are then drained and chilled for about two hours at 40 degrees F. This is, generally, accomplished by placing them in a suitable stainless steel container inside a refrigerator.

At this point, the duck feet are ready for packaging and serving and are edible. They may also be further cooked, depending on the manner in which they are to be served.

The invention is described in detail with reference to particular embodiments, but it should be understood that various other modifications can be effected and still be within the spirit and scope of the invention.

I claim:

1. A method for processing duck feet comprising the steps of:

freezing fresh duck feet at an approximate temperature of minus 20 degrees F. for at least one day;

thawing the fresh duck feet;

slow cooking the duck feet in preheated water for 12½ to 15 minutes;

stopping the cooking of the duck feet;

running cold water over the duck feet for 20 minutes;

cooling the duck feet at 40 degrees F. for two hours;

removing the minor toe and the nails and tips of the major toes;

removing the bones and joints from the major toes;

running cold water over the duck feet for five minutes;

soaking the duck feet in a solution of oxygen bleach and 100 degree F. water for 90-120 minutes;

running cold water over the duck feet for two hours; and then chilling the duck feet at 40 degrees F. for two hours.

2. A method as claimed in claim 1 wherein the step of removing the bones and joints from the major toes is further comprised of:

for each major toe, inserting a hollow tube around the bone of the toe so that the inner surface of the tube contacts the bottom of the bone and some space remains between the top of the tube and the top of the toe;

moving the tube down the length of the bone of each major toe;

manipulating the tube upwards to sever the bone from its joint;

removing the bone of each major toe by hand;

cutting two incisions along either side of the supporting bone in the upper portion of the foot;

cutting a circle around the disc-shaped tendon at the end of the foot; and removing the supporting bone and the tendon at the end of the foot by hand.

3. A method as claimed, in claim 2 wherein the step of inserting a hollow tube around the bone of the toe is further comprised of:

using a tube having the length of 4½ inches, an internal diameter of ¾ inches, a wall thickness of 0.01 centimeter and an oval opening at one or both ends.

4. A method as claimed in claim 2 wherein the step of cutting is further comprised of:

using a pointed knife having a blade length of 6 inches, a maximum height of ⅝ inches and a minimum thickness of 0.01 centimeters.

5. A method as claimed in claim 1 wherein the step of soaking the duck feet in a solution of oxygen bleach and 100 degree F. water for 90-120 minutes is further comprised of:

covering the feet by 1 inch of a solution composed of 100 degree F. water and 6-10 ounces of oxygen bleach for every 30 lbs. of duck feet.

* * * * *